United States Patent
Glenn

[15] 3,660,880
[45] May 9, 1972

[54] HOLLOW BEARING BALL AND PROCESS FOR MAKING THEM

[72] Inventor: Edward R. Glenn, Newport Beach, Calif.
[22] Filed: Mar. 27, 1970
[21] Appl. No.: 23,218

[52] U.S. Cl.............................29/148.4 B, 29/201, 29/463
[51] Int. Cl................B23p 11/00, B23p 19/04, B21d 39/02
[58] Field of Search..................29/148.4 B, 148.4, 201, 463

[56] References Cited

UNITED STATES PATENTS

| | | |
|---|---|---|
| 1,591,372 | 7/1926 | Gatvert et al.......................29/148.4 B |
| 2,177,928 | 10/1939 | Knudsen........................29/148.4 B X |
| 2,682,700 | 7/1954 | Simoneau..........................29/148.4 B |

Primary Examiner—Thomas H. Eager
Attorney—George F. Bethel

[57] ABSTRACT

A hollow bearing ball formed from a relatively resilient steel by initially stamping a round blank from a strip, drawing the blank, and forging and flowing the drawn blank of metal to subsequently form a substantially hemispherical portion of a hollow bearing ball. The hemispherical portions are fed into a hopper which serve to place them in opposed concave relationship after which they are interposed within and between two electrode welding seats which hold the hemispherical portions under pressure and weld them to form a hollow bearing ball.

11 Claims, 8 Drawing Figures

PATENTED MAY 9 1972 3,660,880

INVENTOR.
EDWARD R. GLENN
BY
George H. Bethel

INVENTOR.
EDWARD R. GLENN
BY
George H. Bethel

INVENTOR.
EDWARD R. GLENN

HOLLOW BEARING BALL AND PROCESS FOR MAKING THEM

BACKGROUND OF THE INVENTION

1. Field of the Invention

This invention lies within the bearing ball art and the process of making such balls.

2. Description of the Prior Art

Hollow metal balls have been manufactured in the past for various purposes. However, it is thought that the hollow bearing balls of this particular invention are of a new and novel type and that the process of making the bearing balls is completely different.

As can be appreciated, when ballbearings are utilized in high speed operation they have a substantial amount of inertia. Furthermore, the heavy weight of such ballbearings due to density has limited the application of solid ballbearings. In current aircraft engines, the ballbearings add a significant amount of weight. Thus, if a hollow bearing ball could be fashioned in a suitable and inexpensive manner, a weight factor in a plane could be eliminated which now exists. It is estimated that in some planes, a savings of upwards of 300 pounds could be effectuated by the use of the hollow bearing ball of this invention.

As can be appreciated, when substantial inertial forces are incurred by solid ballbearings, substantial amounts of stress are placed on the bearing races. Bearing races are usually made from a light metal in order to effectuate smooth movement of the bearing balls in the races, as well as limiting inertia when the balls are in rotational movement with respect to a shaft or journal. This invention overcomes the deficiency of solid bearing balls with respect to inertial drag and the limitation of stress on the bearing races.

Although ballbearings are not known as substantial drag elements in an overall mechanical system because of the fact that they are utilized for free rotational movement of a shaft therein, it can be appreciated that the greater the weight of a solid ball with respect to a hollow ball the greater the friction. In other words, frictional forces are a factor of the weight of an object as well as the coefficient of friction. The coefficient of friction of a hollow bearing ball does not change to any significant degree in comparison with a solid bearing ball. Nevertheless, the comparative mass between the two changes the overall frictional drag of each respective bearing ball. This invention has overcome many of the frictional drag drawbacks of prior art bearings by providing a freely moving hollow bearing ball of less weight.

In summation, with respect to hollow bearing balls as opposed to solid bearing balls, it can be stated that the prior art of solid bearing balls has been substantially improved upon by this invention by reducing friction, drag, inertia, stresses and overall weight.

There have been attempts at making substantially hollow balls having a substantial degree of strength. These attempts have usually involved machining two substantially formed hemispheres, and then welding the hemispheres into a completed sphere. This technique has been costly and inadequate because of the requirement that the concavities of the hemispheres be machined along with the outside surfaces thereof. This invention overcomes the requirement of the foregoing machining operations.

The machining of a metallic object does not relieve all the stresses and create the correct geometrical strength relationships required in the surface of a high strength sphere used for a bearing ball. When the machining of a ball is performed, it does not account for the different slip planes and other characteristics of the metal which is inherent in the original formation of the metal, prior to machining.

This invention has overcome the deficiencies of the prior art machining methods by forming a pair of hemispheres for a sphere in a desirable metallurgical manner and then welding them together.

SUMMARY OF THE INVENTION

In summation, this invention comprises a new and novel ballbearing and process for making a high strength bearing ball.

Specifically, the new and novel bearing ball is one which has been formed from a resilient metal stamped into a pair of substantially formed concave hemispheres. The hemispheres are additionally formed by drawing and forging to enhance their strength characteristics. After the prior additional formation, the hemispheres are welded with the concavities thereof in juxtaposed relationship. The end product is devoid of foreign welding material and is comprised of a homogeneous mass of metal.

The method for welding and holding the two substantially formed hemispheres in opposite concave relationship is provided by a continuous feeding, seating and welding process. The seating is sequenced to provide for the receipt of two hemispheres in concave opposed relationship, within two opposing seats with their edges in opposed relationship prior to welding. After the edges of the hemispheres are brought together in opposed relationship, the surfaces thereof are placed under contacting pressure and welded. No additional metal is utilized; solely the metal of each respective hemisphere, thereby avoiding variances in metallic formation and character.

The foregoing cycle can be accomplished within one second intervals to provide a continual feeding, seating and welding of the substantially formed hemispheres into a bearing ball, thus providing a highly efficient and automated formation of the bearing ball.

DESCRIPTION OF THE PREFERRED EMBODIMENTS

Figure 1:
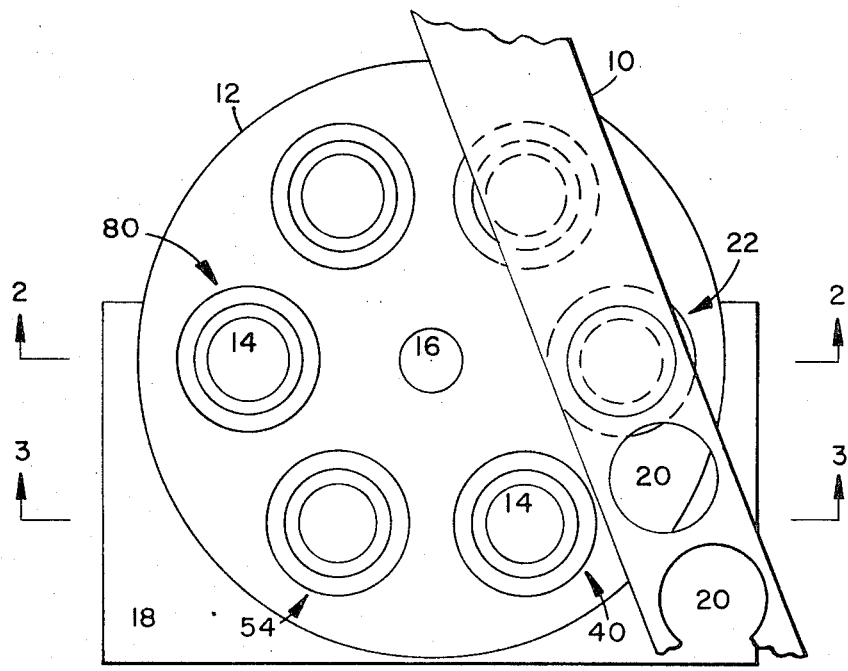
FIG. 1 is a plan view of a portion of the die and forming apparatus of this invention.

FIGS. 1, 2, 3 and 7 relate particularly to the formation of substantially formed hemispheres to be subsequently formed into bearing balls. The process and apparatus for forming the hemispheres initially starts with a strip of resilient metal 10. The metal can be a spring type of steel such as SAE 1095 which has an equivalent carbon content as SAE 52100.

The metal strip 10 is passed over a plurality of female dies formed into a die base 12. The die base 12 incorporates 6 female dies 14 and is provided rotational movement at a centerpost 16. The entire structure is placed upon a base support means 18 having apparatus incorporated thereunder which shall be discussed. The female dies 14 are equally spaced around the periphery of the die base 12. The die base 12 is actuated for rotational movement to equally index each one of the female dies circumferential around the pin 16 in a consistent circumferential movement thereof.

The strip of metal 10 is shown having a plurality of holes 20 punched out of the metal. This has been effectively accomplished by the stamping operation taking place within the female die just previous to the holes 20 as shown in overlying dotted relationship at the station indicated by numeral 22.

The stamping is accomplished in combination with the female die base 12 and dies 14 by a male die support 24. The male die support 24 has a plurality of male dies affixed thereto and moves vertically in overlying relationship with the female die base 12. Thus, as the female die base 12 moves, it cooperates with the male die holder 24 to effectively stamp and process the hemispheres, as each female die 14 respectively moves beneath it.

Figure 2:
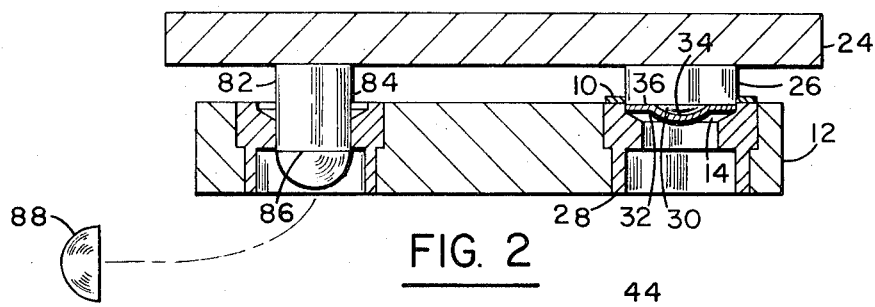
FIG. 2 is a sectional view of the male and female die of this invention as the female die is sectioned along line 2—2 of FIG. 1.

As can be seen in FIG. 2, the male die support 24 as sectioned along line 2—2 of FIG. 1 is provided with a male die 26 which stamps a blank from the sheet of metal 10 at station 22. The male die 26 moves into the female die 14 which has been formed by virtue of an insert 28 in the female die base 12. The male die 26 is provided with a raised portion 30 to effectively dimple a blank of stamped metal 32 with a concavity 34 and an annular outer portion 36.

As the female die base 12 rotates it is indexed under a male drawing die 38. The male drawing die 38 drives the blank of metal 32 down into the female die insert 28 at station 40. The male die portion 38 is formed with a convex rounded portion 42 of a cylinder 44. As the convex rounded portion 42 drives the blank 32 downwardly into the die insert 28, it effectively draws the metal into a hemisphere in a rough draw operation. The rough draw is not sufficient to drive the hemisphere completely through the die insert 28. Thus, the blank 32 is drawn into a rough hemisphere and carried around to a subsequent processing operation, to be described.

After the blank 32 has been drawn into a rough hemisphere the female die base 12 is indexed for placement under a forging head in the form of a male die 46 having a cylindrical portion 48 terminating in a convex hemisphere 50 with an annular ledge 52 therearound between the point of termination of the cylinder 46 and the convex hemisphere 50. The convex hemisphere 50 drives the blank 32 which has been rough drawn downwardly further into the female die insert 28. The female die insert 28 moves in overlying relationship to a forging die block 46 which has a concavity 48 therein for the receipt of the drawn blank 32. The drawn blank 32 is driven down into the forging die block 46 by virtue of the rounded end portion 50 pushing the blank thereinto.

Figure 3:
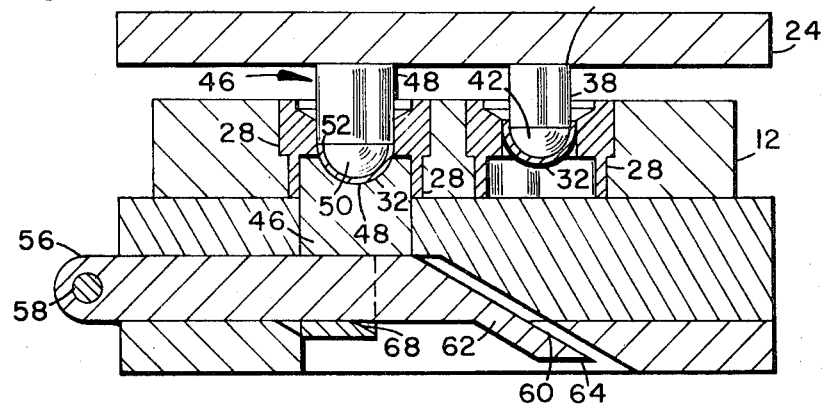
FIG. 3 is a sectional view of the male and female die as the female die is sectioned along line 3—3 of FIG. 1.
Figure 4:
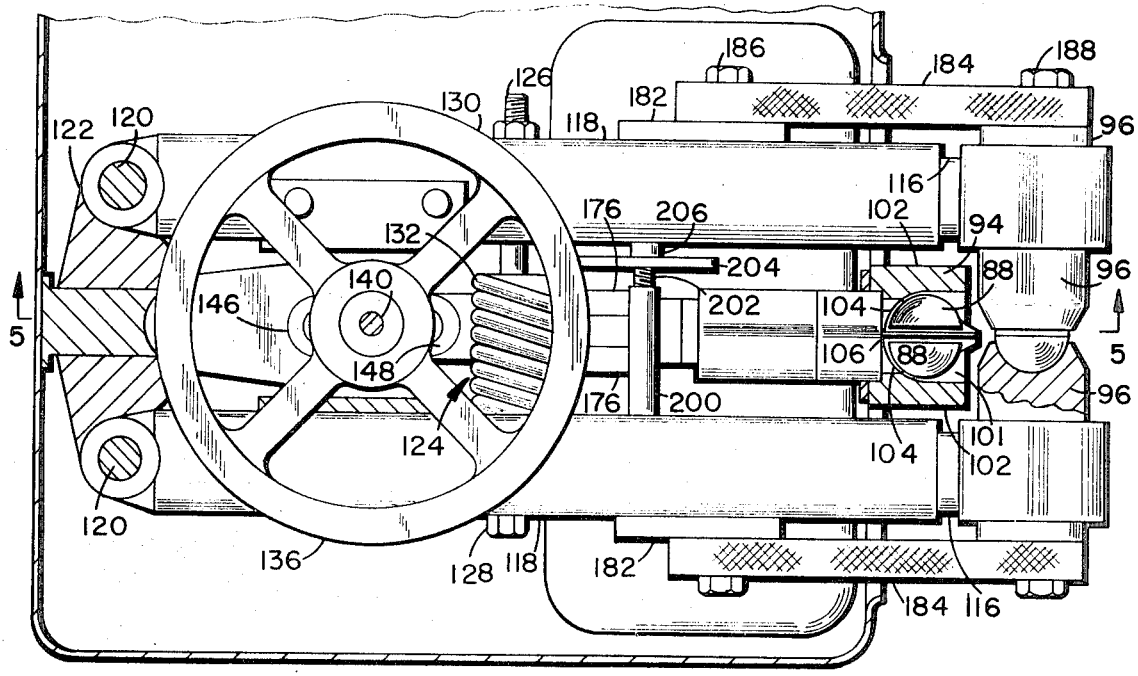
FIG. 4 is a partially sectioned plan view of apparatus for practicing this invention.
Figure 5:
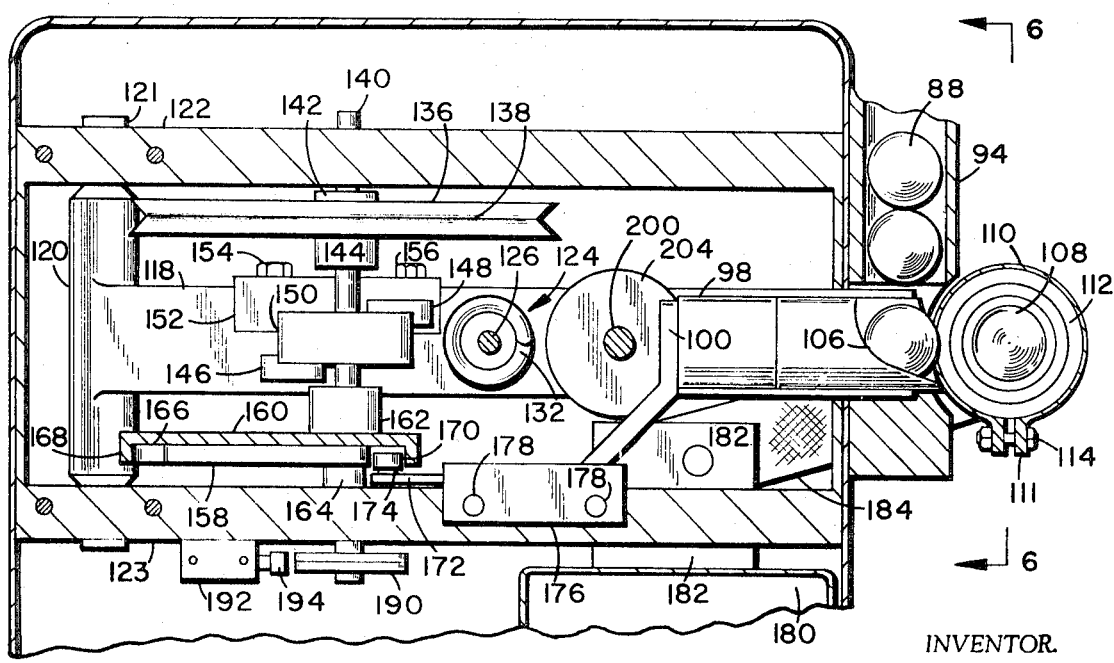
FIG. 5 is a partially sectioned side view along line 5-5 of FIG. 4 showing apparatus for practicing this invention.
Figure 7:
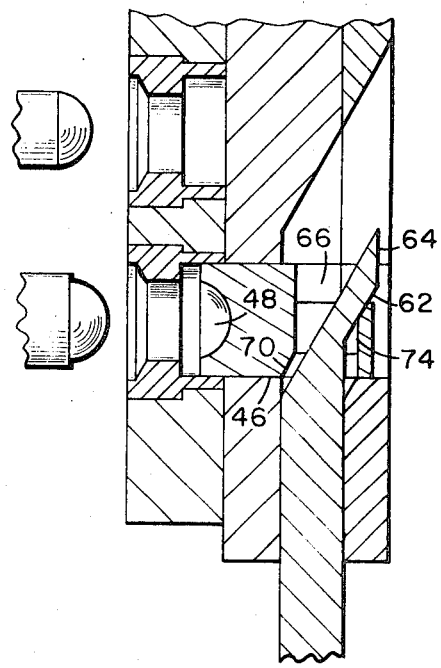
FIG. 7 is a portion of the same sectional view of FIG. 3 taken at a different moment in time; and, FIG. 8 is a schematic diagram of the circuitry of this invention.
Figure 8:
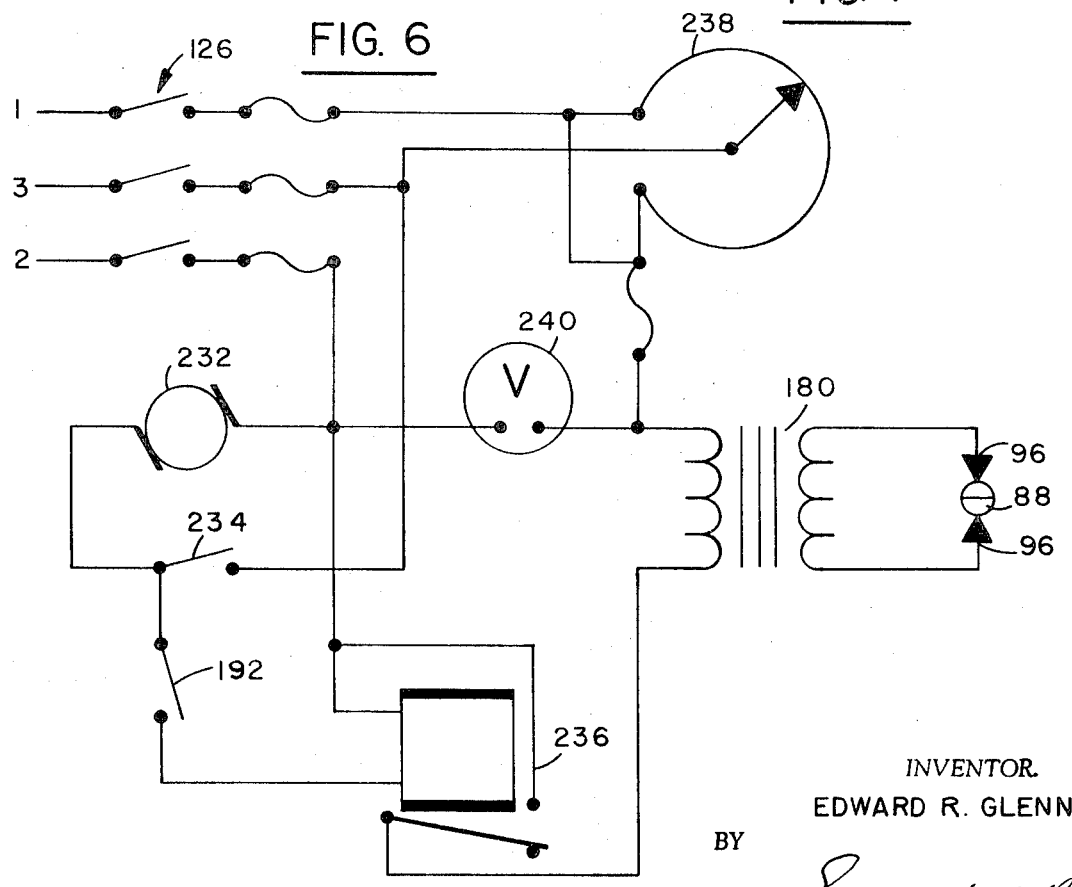

To effectuate the foregoing operation, the forging die block 46 is moved upwardly under the female die insert 28 when the support 12 is moved thereover at station 54, with the blank 32. To move the forging die block 46 into the insert 28, the block is cammed upwardly by virtue of the action of a camming rod 56 which is actuated for longitudinal movement at a connection point 58. The camming rod 56 has an inclined surface 60 which serves to drive against the base of the forging die block 46 when it is moved forwardly as shown in FIGS. 3 and 7. Upon retraction of the camming rod 56 the interior camming surface 62 operates to move against the interior of the base of the die block insert 46 so that it is pulled downwardly until the planar holding surface 64 of the camming rod overlies the interior bore of the forging die block.

Specifically, the forging die block 46 has a passage 66 in surrounding relationship with the respective exterior and interior cam surfaces 66 and 62 so that the camming rod 56 can move in longitudinal relationship therein. The interior of the forging die block has a sloping surface 68 corresponding to the interior cam surface 62 for camming it downwardly. The interior of the forging die block 46 has a sloping surface 70 for upward camming action of the interior of the forging die block by movement against the exterior camming surface 66. As can be seen in FIG. 7 the interior camming surface 62 of the rod 56 pulls the interior of the forging die block 46 downwardly toward the end of the rod stroke. This action removes the forging block 46 from the female die carrier 12, so that it can then rotate to station 80.

The action which takes place at station 54 is generally one of a forging and flowing action of the metal blank 32. The flowing action forges the blank to a high density and stabilizes stresses by flowing the metal into a desirably formed hemisphere. If the metal were not flowed and forged, the original rolling stresses and stresses stemming from the draw which take place at station 40 would still be inherent within the blank 32.

The station 22 as previously described provides the blank with a dimple or concavity 34 by virtue of the action of the blank stamping male die 26. The blank stamping male die 26 serves to precondition and preform the blank 32 by virtue of the convex section 30 that forms the concavity 34 within the blank. It is the combination of the forming of the concavity, the drawing and specifically the forging which makes the high quality bearing ball of this invention.

As previously stated, subsequent to the forging and flowing operation at station 54 the female die base 12 is indexed to station 80. Station 80 underlies a male die 82 formed as a cylindrical section 84 terminating in a flattened end portion 86 overlying the blank 32 which has been formed into a hemisphere 88. The flattened end portion 86 drives down and pushes the hemisphere 88 which has been formed from the blank 32 outwardly for future use. At this stage of the operation a well formed hemisphere 88 is provided having the necessary strength requirements for future formation as a sphere, with another hemisphere. The hemispheres 88 are then cleaned and removed of any extraneous materials in a subsequent operation which can be performed by any standard metal cleaning operation.

Figure 6:
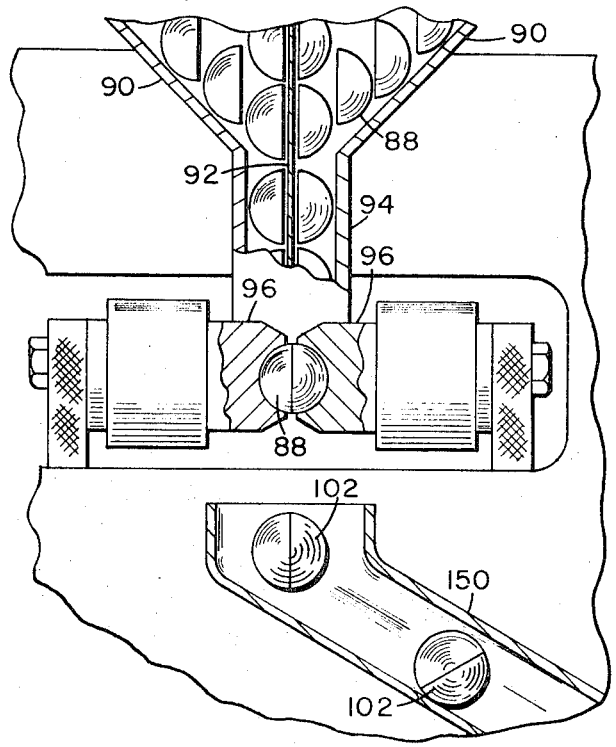
FIG. 6 is a sectioned view toward line 6—6 of FIG. 5 showing a detailed view of the feed and hemisphere seating and welding apparatus of this invention.

After the parts are cleaned they are placed in a hopper which can be of any suitable configuration known in the art but has been shown for purposes of explanation as that of FIG. 6 having funnel shaped side walls 90. The desired end result is that the hemispheres 88 be placed in discrete concave opposite adjacent relationship by virtue of a divider wall 92 separating the hemispheres. The hopper should effectively place the hemispheres 88 in juxtaposed relationship as they move into the neck 94 of the funnel. The adjacent concave relationship of the hemispheres 88 allows them to move to a point where they can be subsequently fed into a welding operation.

The neck 94 of the hopper feeds the hemispheres 88 into an area adjacent electrodes 96. The electrodes 96 cooperate effectively to hold the hemispheres 88 in opposed concave adjacent relationship. The electrodes 96 draw apart in a manner to be described and are fed the hemispheres in the concave adjacent relationship by a loading finger 98 which serves to feed the hemispheres 88 in a sequential manner. The loading finger 98 is driven by a loading finger connector 100 which serves to drive the loading finger forwardly for receipt of the hemispheres 88. The hemispheres 88 drop down onto a ledge 101 of the loading finger 98 between surrounding walls 102. The walls 102 serve to hold the hemispheres 88 with the aid of a magnetized concave surface of a member 104 having a similar curvature to the outside circumference of the hemispheres 88. The magnet 104 serves to hold the hemispheres 88 in adjacent relationship to each other in a position suitable for subsequent welding operations. The hemispheres 88 are fed to the finger in a separated condition by the wall 92 and held apart from each other by virtue of a fin 106 which serves to hold the hemispheres 88 apart after they have been fed through the neck of the funnel 94. In other words the fin 106 acts as a further extension of the wall 92 so that when the hemispheres are dropped from the funnel 94 in divided relationship on either side of the wall the fin 106 extends the wall to accommodate the proper feeding of the hemispheres to the electrodes 96.

The electrodes 96 are formed with two partially concave hemispherical seats 108 for the receipt of the hemispheres 88. The electrodes 96 are held by retainer clamps 110 which hold the electrodes 96 in clamped insulated relationship with insulating material 112 between the clamp and the electrode. The entire assembly is secured by the appendages 111 of the retainer clamps 110 with bolts 114 in tightened relationship with the appendages of the retainer clamps so that they clamp the insulating material 112 over the electrodes 96, in addition to holding the electrodes.

The retainer clamps 110 secure the electrodes 96 and are in turn secured to connectors 116 which are attached to a pair of arms 118. The arms 118 are respectively connected to and pivoted on rotatable support cylinders 120 which are journaled at the respectively reduced ends 121 thereof into main upper and lower frames, respectively 122 and 123. The frames 122 and 123 serve to support the arms so that they may be moved about the axis on which they are journaled. The main frames 122 can be formed in any suitable manner so long as they are capable of supporting not only the rotatable support cylinders 120 to which the arms 118 are attached but also the other apparatus journaled and/or connected thereto which shall be discussed.

The arms 118 are provided with arcuate movement by virtue of being connected to the rotatable support cylinders 120 which have the previously referred to tapered ends 121. The arms 118 are caused to rotate in a radial manner around the rotatable support cylinders 121. The arms are held in an interior position prior to outward radial movement by virtue of a spring and shackle system 124. The spring and shackle system 124 comprises a pair of bolts 126 and 128. The bolt 126 is secured outside an arm 118 at one end by a nut 130 and at the other end is internally secured within a spring 132 having an internal securing means for holding the bolt therein. The bolt 128 is also secured within the spring 132 in distal relationship from the head which is the only exposed portion of the bolt. As the arms 118 move radially outwardly, they tend to pull against the compressive tensile loading provided by the spring 132. The compressive tensile force of the spring 132 is overcome by a rotational camming drive system which shall be explained.

The rotational camming drive system previously mentioned is driven by a drive wheel 136 which can be turned by any suitable belt driving motor to drive a belt seated within a groove 138 in the driving wheel. The driving wheel 136 is supported on a shaft 140 which is journaled for smooth rotational movement within the frames 122 and 123. The shaft 140 has a pair of clamping collars 142 and 144 surrounding the shaft to hold the driving wheel 136 in fixed position on the shaft 140. The shaft 140 supports a pair of cams 146 and 148 which are connected to a cam support member 150 which is in turn connected to the shaft. Attached to the arms 118 interiorly thereof are a pair of plates 152 secured thereto by a pair of bolts 154 and 156 for receiving the force of the camming action provided by the cams 146 and 148. The foregoing force serves to actuate the arms 118 in an outward manner under the tension of the spring 132.

The shaft has a cam 158 attached to it with a cover 160 thereover and is attached to the shaft 140 by means of collars 162 and 164. The collars 162 and 164 secure the cam 158 so that as the cam 158 rotates any object within a groove 166 will follow the cam's movement. The groove 166 as can be seen is provided by virtue of the overlying edge flange 168 of the cam cover 160 which circumscribes the cam 158. Internally of the groove 166 a roller 170 is placed which is attached to an arm 172. The roller 170 is attached by means of a connecting pin 174 so that it can rotatably move within the groove 166 to follow the action of the cam 158. As the cam rotates, the arm 172 which is formed as a portion of the loading finger connector 100 moves backwardly and forwardly within a pair of guides 176 secured by bolts 178 to the frame 123. Thus, upon rotation of the shaft 140 the cam 158 operates to move the loading finger connector 100 back and forth by the movement of the arm 172 and roller 170 actuated by the cam.

In order to effectively operate the welding apparatus of this invention, a transformer generally shown as a box 180 is provided with connection bars 182 extending therefrom. The connection bars 182 are in turn connected electrically by means of flexible metal straps 184 to a portion of the electrodes 96. The straps 184 are bolted to the connection bars 182 by bolts 186 and to the electrodes 96 by bolts 188.

The electrodes 96 are supplied with a suitable electrical current for welding purposes by the transformer 180 providing a current through the connection bars 182. The switching on of the current is performed by a cam 190 which turns on the shaft 140 so that it actuates a switch 192 having a cam follower 194 for movement when the cam turns against it. The switch 192 which is operated by the cam follower 194 is connected to a power source shown in FIG. 6 and a variable generator which supplies the transformer 180 for rendering a current to the electrodes 96.

The electrodes 96 are spaced apart for receipt of the hemispherical portions 88 which form the bearing balls of this invention by a spacer which shall be described. The spacer comprises an internally threaded cylinder 200 which has an externally threaded member 202 threaded therein. The externally threaded member 202 rotatably seats within the internally threaded member 200 and is provided with a knurled wheel 204 which has a pad 206 on the surface thereof. The pad 206 moves against an arm 118 to space that arm from its opposing arm. The internally threaded member 200 is affixed to the opposing arm 118 so that as the knurled knob is rotated for movement of the pad 206 against the opposite arm 118 it provides a jackscrew adjustment for spacing of the arms.

In order to operate the apparatus it can be connected electrically to a 240 volt 60 cycle line across terminals shown in FIG. 6 by a three pole switch 126. A motor 232 is connected across the line for 120 volt operation. The motor 232 is connected by the drive wheel 136 to the shaft 140 and serves to provide the mechanical power as well as the switching functions necessary to cause the apparatus hereof to function.

The motor is controlled by a switch 234 which is placed across the 120 volt line source. The cam operated switch 192 is shown connected across the line for operation of a relay 236, which is generally shown in schematic form. The relay 236 serves to cause the transformer 180 to effectively provide a current through the electrodes schematicllay shown at 96 in FIG. 6 with a pair of hemispheres 88 shown therebetween. The transformer 180 is provided with the proper power level by a variable generator 238, or any other suitable means to provide power across the lines of the transformer. In order to control the proper level of the power across the transformer 180, a volt meter 240 is placed across the line so that the proper electrical current is delivered to the electrodes 96 for welding the hemispheres 88.

In operation, the main line switch provided by the switch 226 is thrown. The circuit is now live and the only thing necessary to start the operation of the apparatus is turning on the control power switch 234 to cause the motor 232 to turn. As the motor 232 turns, the hemispheres 88 are fed downwardly toward the feeding finger 98 and into the electrodes 96. The switch 192 which is operated by the cam 190 serves to operate the relay 236 for energizing the electrodes 96 each time the hemispheres 88 are in juxtaposition between the electrodes, thus causing the hemispheres to be welded.

One of the key features of this invention is that during the welding process no foreign metal is introduced to form the hemispheres 88 into a bearing ball. The weld is performed by the flow of metal between each respective hemisphere 88 to the other in a fusion process. Such a weld causes not only a uniformity of metal at the weld point, but also a degree of uniformity throughout the finished product. The finished product therefore provides a substantially homogeneous hollow bearing ball without layers of varying types of metal.

AFter the electrodes 96 have welded the hemispheres 88 into a sphere, they are dropped by virtue of the electrodes separating. The spheres drop into a receiving chute 150. The receiving chute 150 is connected to a hopper or other suitable means for collecting the spheres 102. After the spheres 102 have been passed from the chute 150 into a hopper or other suitable receiver, they are then polished to a high degree for purposes of effectuating a relatively smooth and friction free bearing ball.

The foregoing specification clearly defines specific embodiments incorporating the invention hereof, however, the invention as to its breadth and scope is only to be read and defined in light of the following claims.

I claim:

1. Apparatus for forming a substantially formed hemisphere from a sheet of metal comprising:
   a female die;
   a male die for punching a rounded blank from a strip of metal in cooperation with said female die;
   a male die for drawing the rounded blank of metal subsequent to the punching operation into a substantially hemispherical configuration in cooperation with a female die;
   a male die forging the drawn metal blank in cooperation with a female die; and
   means for relative movement of said male dies with respect to said female die for respectively punching, drawing and forging the metal in situ within said female die.

2. Apparatus as claimed in claim 1 wherein said male punching die further comprises:
   a raised portion on the surface thereof for effectively creating a concavity at the point where said male die strikes the punched metal.

3. Apparatus as claimed in claim 2 further comprising:
   a plurality of female dies and means for effecting relative movement of the female dies with respect to said stamping, drawing and forging dies to provide a sequence of male die operations sequentially with the female dies.

4. Apparatus as claimed in claim 2 further comprising:
   a second female die for underlying placement beneath said first female die to provide a contiguous die form with said first female die wherein said male forging die moves into said first female die to forge at least partially within said second female die.

5. Apparatus as claimed in claim 2 further comprising:
   means for relative movement of a strip of sheet metal to be punched and formed into a hemisphere within each respective female die.

6. Apparatus as claimed in claim 2 further comprising:
   a plurality of female dies;
   means for rotating the plurality of female dies; and
   means for combined actuation of said male dies in vertical overlying relationship with said female dies.

7. A process for forming a substantially hemispherical object comprising:
   punching a substantially rounded blank from a piece of metal;
   drawing said rounded metal blank to provide a substantial depression therein; and
   forging said metal blank into a substantially hemispherical object.

8. A process as claimed in claim 7 further comprising:
   flowing the metal simultaneously during the forging process into a die while it is being forged.

9. A process as claimed in claim 7 further comprising:
   punching on a sequential basis a blank of metal prior to drawing and forging the metal.

10. A process as claimed in claim 9 further comprising:
    dimpling said metal blank while simultaneously punching the blank from a sheet of metal.

11. A process as claimed in claim 10 further comprising:
    flowing the metal after it is drawn into a female die by substantial compressive factors created by a male die.

* * * * *